United States Patent
Sheff

(10) Patent No.: US 11,198,323 B2
(45) Date of Patent: Dec. 14, 2021

(54) CYCLING AERO FOIL SYSTEM

(71) Applicant: Donald A. Sheff, Mill Valley, CA (US)

(72) Inventor: Donald A. Sheff, Mill Valley, CA (US)

(73) Assignee: COEFFICIENT CYCLING LLC, Redwood City, CA (US)

( * ) Notice: Subject to any disclaimer, the term of this patent is extended or adjusted under 35 U.S.C. 154(b) by 295 days.

(21) Appl. No.: 16/191,991

(22) Filed: Nov. 15, 2018

(65) Prior Publication Data

US 2019/0143747 A1 May 16, 2019

Related U.S. Application Data

(60) Provisional application No. 62/586,710, filed on Nov. 15, 2017.

(51) Int. Cl.
 *B60B 21/02* (2006.01)
 *B60B 1/02* (2006.01)
 *B60B 1/00* (2006.01)

(52) U.S. Cl.
 CPC ............ *B60B 21/026* (2013.01); *B60B 21/02* (2013.01); *B60B 1/003* (2013.01); *B60B 1/02* (2013.01); *B60B 2900/1216* (2013.01)

(58) Field of Classification Search
 CPC .. B60B 1/00; B60B 1/003; B60B 1/02; B60B 21/02; B60B 21/026; B60B 21/06; B60B 21/062; B60B 2900/1216
 See application file for complete search history.

(56) References Cited

U.S. PATENT DOCUMENTS

| | | | |
|---|---|---|---|
| 6,086,161 A * | 7/2000 | Luttgeharm | B60B 1/003 301/104 |
| 7,114,785 B2 | 10/2006 | Ording | |
| 8,757,733 B2 | 6/2014 | Smart | |
| 9,457,618 B2 * | 10/2016 | Smart | B60B 1/003 |
| 9,610,800 B2 * | 4/2017 | Katsanis | B60B 21/062 |
| 2014/0265431 A1 | 9/2014 | Magee | |
| 2016/0243889 A1 * | 8/2016 | Habermacher | B32B 37/14 |
| 2016/0263938 A1 * | 9/2016 | Lew | B60B 21/02 |
| 2017/0232790 A1 * | 8/2017 | Hall | B60B 21/104 301/58 |

FOREIGN PATENT DOCUMENTS

DE    102011107063 A1 *  1/2013  ............... B60B 1/14

* cited by examiner

*Primary Examiner* — Kip T Kotter
*Assistant Examiner* — Emily G Castonguay
(74) *Attorney, Agent, or Firm* — James E. Eakin

(57) ABSTRACT

The coefficient cycling aero foil system is designed to reduce drag and turbulence from a tire and spokes used to support a bicycle wheel. The system is integrated into a rim on a bicycle wheel which allows for increased forward momentum by cutting drag and reducing wheel turbulence that occurs during the rotation of a bicycle wheel. The foils may be strategically placed for optimum aerodynamic wind flow and are precisely angled to force wind past the foil creating increased forward momentum.

7 Claims, 5 Drawing Sheets

CYCLING AERO FOIL SYSTEM

CROSS REFERENCE TO RELATED APPLICATION

The present application is related to and claims priority to U.S. Provisional Patent Application No. 62/586,710 filed Nov. 15, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of cycling and more specifically relates to cycling aerodynamic manipulation.

2. DESCRIPTION OF RELATED ART

Spinning spoked wheels create aerodynamic resistance, or drag, which result in loss of forward momentum. Drag is created by the spoked wheel spinning against the ground as well as the air around the spoked wheel. Drag can be increased by wind movement and speed of travel. The drag created when cycling can increase by a variety of factors and can increase the time it takes to move from one point to another.

Professional cyclists often try to achieve the fastest time possible when competing. They rely heavily on their equipment, such as a bicycle, to be as efficient as possible. Aerodynamics plays a big part in cutting minutes off the final time in a race. The aerodynamic drag increases during a race which also leads to increased fatigue on the cyclist engaged in the race. A suitable solution is desired.

U.S. Pat. No. 8,757,733 to Simon Smart relates to an optimum aerodynamic bicycle wheel. The described optimum aerodynamic bicycle wheel includes embodiments which improve airflow around the bicycle wheels by providing for one or more of: (1) an optimum leading edge width of a rim for preventing early stall in cross winds, while still allowing for sufficient stability without undue drag, while not unnecessarily increasing the rotating wheel and drag on the frame; (2) a sidewall shape with a subtle camber angle at the leading, which defines a rate of radius change at the max width of the rim—which further defines the max width and placement along the chord length for optimizing the aerodynamic properties of the rim; (3) a continuous rate of change of curvature at a spoke face, which fundamentally improves the performance and stability by generating a side force at higher yaw angles; and (4) wheel sets with a wider front rim relative to a narrower rear wheel to assist in flow attachment in high crosswind areas.

BRIEF SUMMARY OF THE INVENTION

In view of the foregoing disadvantages inherent in the known cycling art, the present disclosure provides a novel coefficient cycling aero foil system. The general purpose of the present disclosure, which will be described subsequently in greater detail, is to provide a foil system designed to reduce drag and turbulence from a tire and spokes used to support a bicycle wheel.

A coefficient cycling aero foil system is disclosed herein. The coefficient cycling aero foil system includes a bicycle wheel rim having a tire engaging portion and an inner periphery. A plurality of spokes are positioned around the inner periphery of the wheel rim. The wheel rim is configured to receive a tire at the tire engaging portion. A plurality of air foils are configured in a series around the inner periphery of the wheel rim. The plurality of air foils comprise carbon fiber. The plurality of air foils further comprise a convex bulbous profile with a rounded leading edge and a sharp trailing edge. The plurality of air foils is/are strategically placed for optimum aerodynamic wind flow and are precisely angled to force wind past the air foils creating increased forward momentum while the bicycle is in forward motion. The air foils reduce drag and increase forward momentum by cutting turbulence created when the tire spins.

Those with ordinary skill in the art will now appreciate that upon reading this specification and by their understanding the art of cycling and aerodynamics as described herein, methods of reducing drag will be understood by those knowledgeable in such art.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a coefficient cycling aero foil system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to cycling and more particularly to a coefficient cycling aero foil system as used to improve the cycling aerodynamic manipulation.

Generally, the coefficient cycling aero foil may be designed to reduce drag and turbulence from a tire and spokes used to support a bicycle wheel. Turbulence is caused by the bicycle wheel spinning which creates drag that may impede forward momentum. The coefficient cycling aero foil is designed to be structurally connected to a rim which creates an aerodynamic concave cup on the receding side of a spoke. The coefficient cycling aero foil may be designed to increase speed while reducing drag. This may be done by the lift principle of a wing using a convex aerodynamic shape while in the ascending phase of rotation. The rotational forward speed may be twice the hub speed, thereby allowing the lifting body to create a Reynolds Number sufficient for lift into the forward rotation.

The shape of the coefficient cycling aero foil may give a boost to lift while maintaining a steady pressure, through constrained laminar flows which act upon the lifting side of the design. On the reverse rotation, a convex shape captures the airflow of the receding spin of the wheel past the spoke while the wheel is receding in rotation. This action may cause increased speed, reduce drag and therefore may increase forward momentum. The wheel may be constructed from carbon fiber or any other suitable material. An additional benefit may be that the braking surface will increase in depth and cooling of this surface will more easily radiate away from brake surface.

The coefficient cycling aero foil may be strategically placed around the inner periphery of the wheel rim. The convex shape design uses aerodynamic forces to reduce drag and increase forward momentum by cutting the turbulence created when a wheel spins. The foils are placed around the spokes and are eighty millimeters in length if there are twenty spokes within the rim, and alternately, sixty millimeters in length if there are twenty-four spokes within the rim. Other versions are envisioned. The foil may have a convex bulbous shape which is placed on the leading edge of the foil. The relative angles of the convex bulbous shape start at the tip of the foil where there is a two-degree edge, at fifteen millimeters, the edge is then seven degrees, in preferred embodiments, at thirty millimeters, the edge angle is thirty-four degrees, and lastly at forty millimeters, the angle is reduced to twenty-five degrees. This creates a trailing edge design that is concave, increasing lift.

Figure 1:
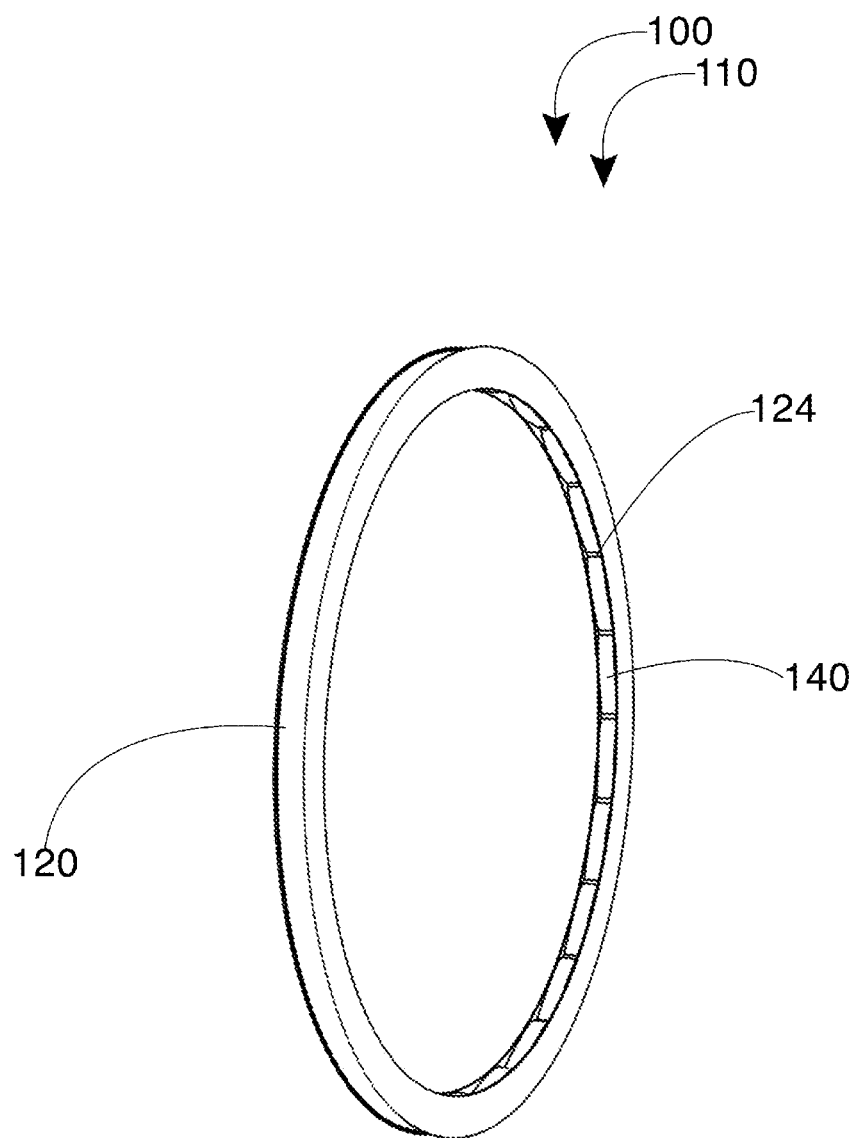
FIG. 1 is a perspective view of the coefficient cycling aero foil system during an 'in-use' condition, according to an embodiment of the disclosure.

Referring now more specifically to the drawings by numerals of reference, there is shown in FIGS. 1-5, various views of a coefficient cycling aero foil system 100. FIG. 1 shows a coefficient cycling aero foil system 100, according to an embodiment of the present disclosure. As illustrated, the coefficient cycling aero foil system 100 may include a wheel rim 110 having a tire engaging portion 120 and an inner periphery 124. A plurality of spokes 128 are positioned around the inner periphery 124 of the wheel rim 110. The wheel rim 110 is configured to receive a tire at the tire engaging portion 120. A plurality of air foils 140 are configured in a series around the inner periphery 124 of the wheel rim 110. The plurality of air foils 140 each comprise a convex aerodynamic shape having a leading edge 142 and a trailing edge 144. The plurality of air foils 140 are strategically placed for optimum aerodynamic wind flow and are precisely angled to force wind past the air foils 140 creating increased forward momentum while a bicycle is in forward motion. The air foils 140 reduce drag and increase forward momentum by cutting turbulence created when the tire spins.

Figure 2:
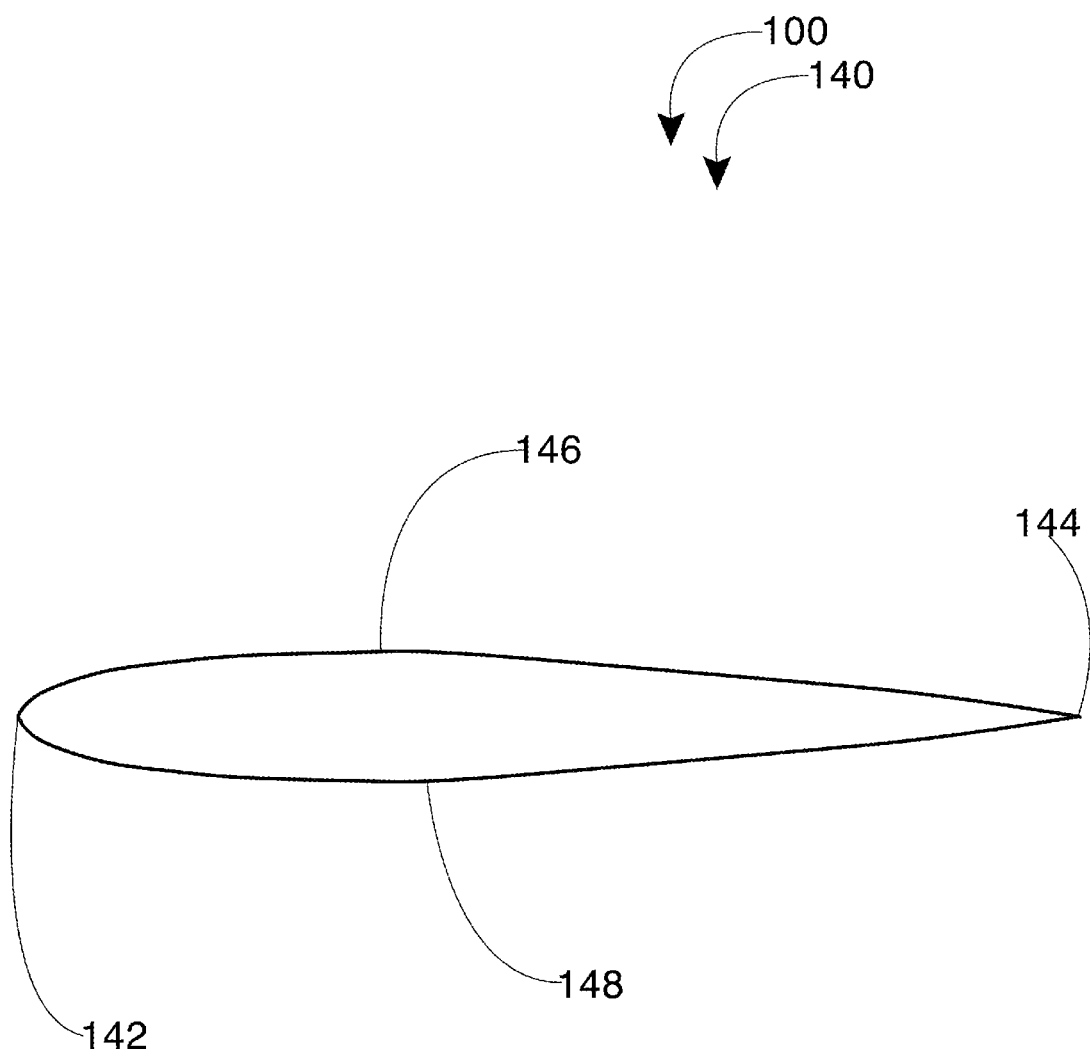
FIG. 2 is a side view of one of a plurality of air foils of the coefficient cycling aero foil system of FIG. 1, according to an embodiment of the present disclosure.

FIG. 2 shows a side view of one of the plurality of air foils 140 of the coefficient cycling aero foil system 100 of FIG. 1, according to an embodiment of the present disclosure. As above, the coefficient cycling aero foil system 100 may include the wheel rim 110 having the tire engaging portion 120 and the inner periphery 124. The plurality of air foils 140 are configured in a series around the inner periphery 124 of the wheel rim 110. Each of the plurality of air foils 140 includes the leading edge 142 and the trailing edge 144. The leading edge 142 of each of the plurality of air foils 140 comprises a greater thickness than the trailing edge 144. The plurality of air foils 140 are positioned in a series with the trailing edge 144 abutting the leading edge 142 of another one of the air foils 140. A first-end 130 of the plurality of spokes 128 is positioned between the trailing edge 144 of one of the air foils 140 and the leading edge 142 of another one of the air foils 140. A second-end 132 of each of the plurality of spokes 128 is attached to a hub 112 of the wheel rim 110.

Figure 3:
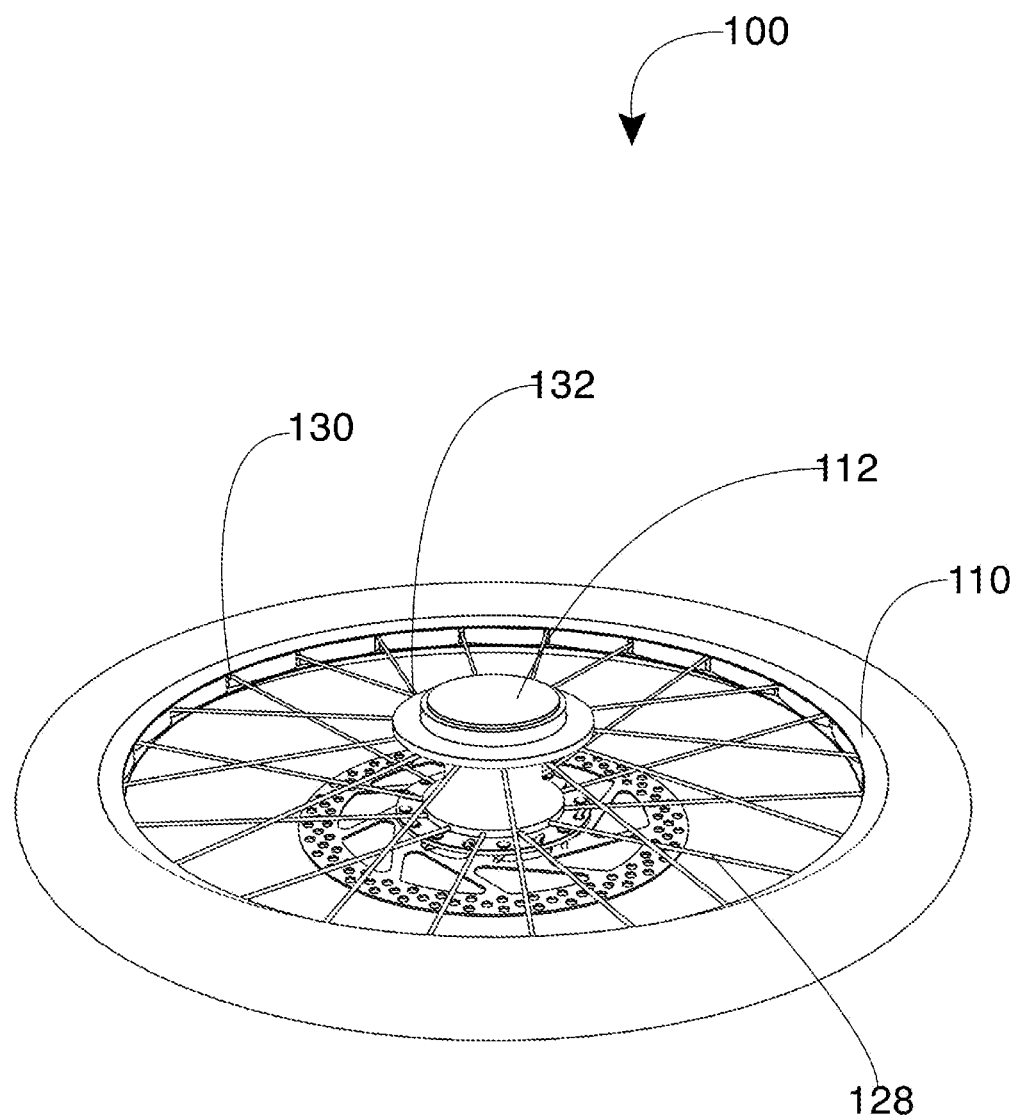
FIG. 3 is a perspective view of the coefficient cycling aero foil system of FIG. 1, according to an embodiment of the present disclosure.

FIG. 3 shows a perspective view of the coefficient cycling aero foil system 100 of FIG. 1, according to an embodiment of the present disclosure. As above, the coefficient cycling aero foil system 100 may include the plurality of air foils 140 positioned around the inner periphery 124 of the wheel rim 110. The plurality of air foils 140 are integral to the wheel rim 110. An upper-surface 146 and a lower-surface 148 of each of the plurality of air foils 140 comprise a symmetrical curvature. In a preferred embodiment, the plurality of air foils 140 comprise carbon fiber. Other suitable materials may be used. The plurality of air foils 140 further comprise a convex bulbous profile with a rounded leading edge 142 and a sharp trailing edge 144.

Figure 4:
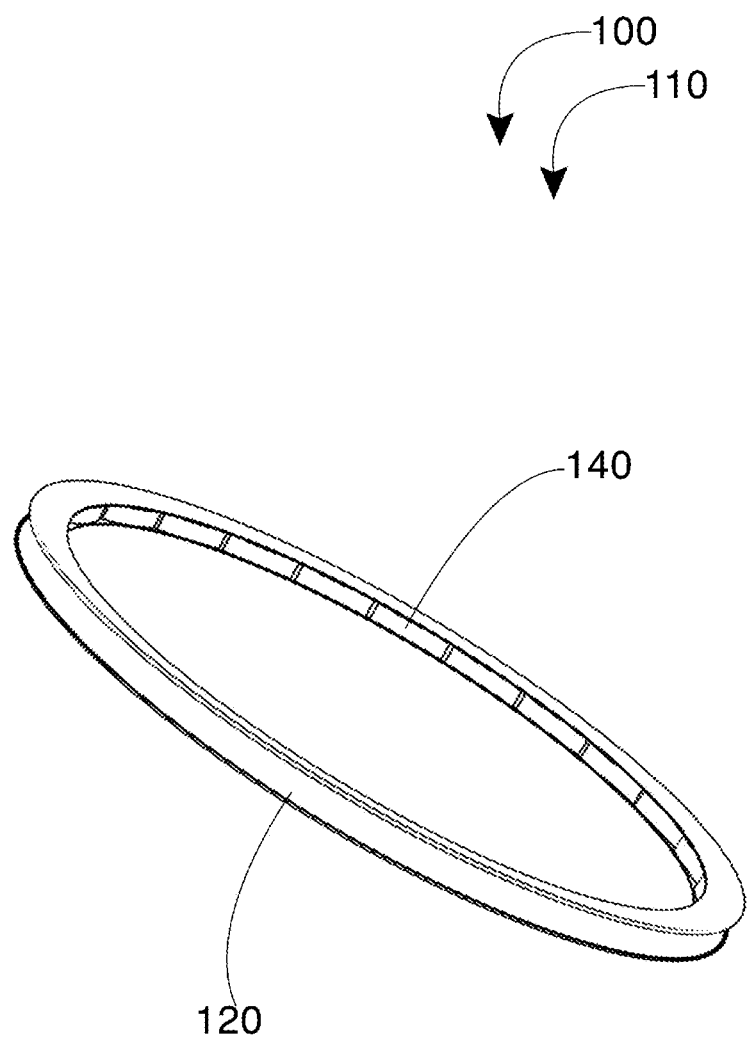
FIG. 4 is a top perspective view of the coefficient cycling aero foil system of FIG. 1, according to an embodiment of the present disclosure.

FIG. 4 shows a perspective view of the coefficient cycling aero foil system 100 of FIG. 1, according to an embodiment of the present disclosure. As above, the coefficient cycling aero foil system 100 may include the wheel rim 110 having the tire engaging portion 120 and the inner periphery 124. The plurality of air foils 140 are configured continuously along an entire the inner periphery 124 of the wheel rim 110. The leading edge 142 is positioned in front of each of the spokes 128 and the trailing edge 144 is positioned behind each of the spokes 128. The wheel rim 110 may comprise a plurality of apertures configured to receive the first-end 130 of the plurality of spokes 128. In certain embodiments, the plurality of air foils 140 may further comprise apertures for optimal air flow.

Figure 5:
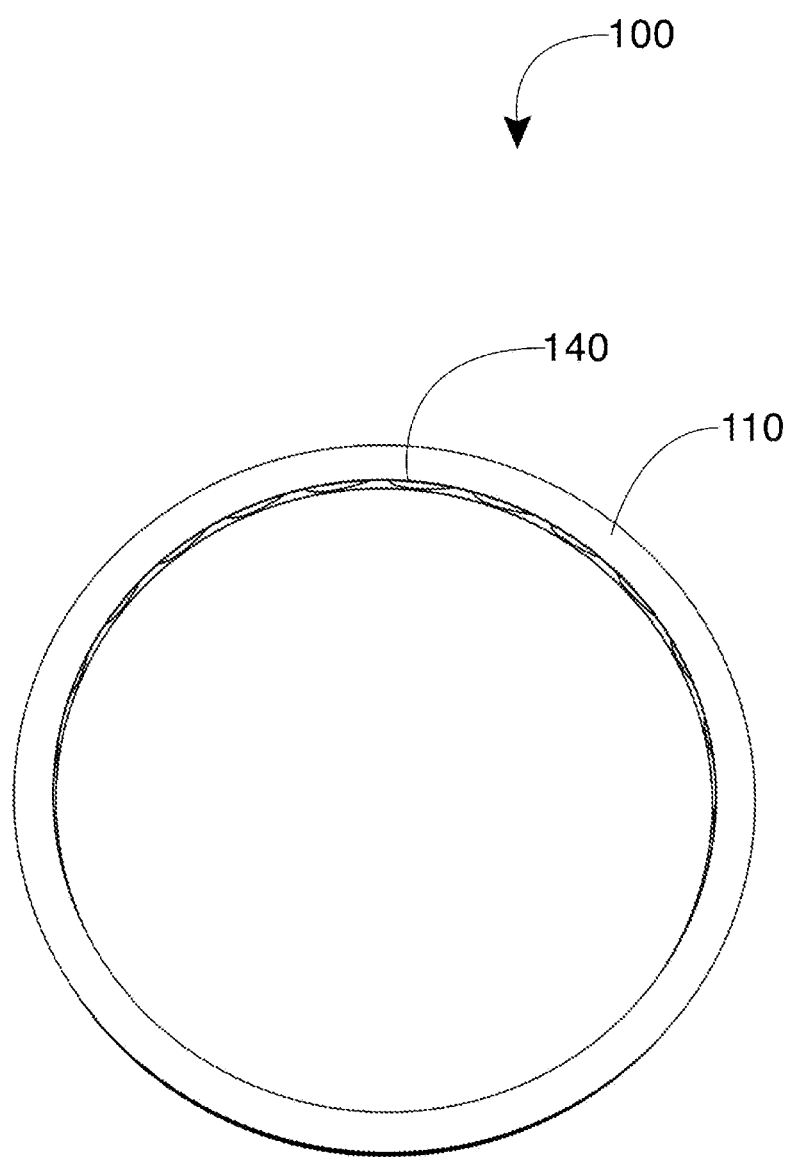
FIG. 5 is a perspective view of the coefficient cycling aero foil system of FIG. 1, according to an embodiment of the present disclosure.

FIG. 5 shows a perspective view of the coefficient cycling aero foil system 100 of FIG. 1, according to an embodiment of the present disclosure. As above, the coefficient cycling aero foil system 100 may include the plurality of air foils 140 positioned around the inner periphery 124 of the wheel rim 110. With tires including 20 individual-spokes, each of the plurality of air foils is approximately eighty millimeters in length. If the tire includes 24 individual-spokes, each of the plurality of air foils 140 may be approximately sixty millimeters in length. In a preferred embodiment, each of the plurality of air foils 140 comprises a minimum length of sixty millimeters and a maximum length of eighty millimeters. The wheel rim 110 is preferably a 34-millimeter wheel rim 110 having a width of 16 millimeters. Other measurements and options are available in alternate embodiments. Upon reading this specification, it should be appreciated that, under appropriate circumstances, considering such issues as user preferences, design preference, structural requirements, marketing preferences, cost, available materials, technological advances, etc., other foil arrangements may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cycling aero foil system comprising
    a wheel rim having
        a tire engaging portion; and
        an inner periphery;
    a plurality of spokes positioned around the inner periphery of the wheel rim, the wheel rim being configured to receive a tire at said engaging portion;
    a plurality of air foils configured in a series around said inner periphery of said wheel rim;
    wherein the plurality of air foils each comprises a convex aerodynamic shape having a leading edge and a trailing edge and the leading edge is positioned in front of each of the spokes and the trailing edge is positioned behind each of the spokes;
    wherein said plurality of air foils are placed for optimum wind flow and are angled to force wind past said air foils creating increased forward momentum while a bicycle is in forward motion; and
    wherein said air foils reduce drag and increase forward momentum by cutting turbulence created when said tire spins.

2. The cycling aero foil system of claim 1 wherein the wheel rim comprises a plurality of apertures configured to receive the first end of the plurality of spokes.

3. A cycling aero foil system comprising
    a wheel rim having
        a tire engaging portion; and
        an inner periphery;
    a plurality of spokes positioned around the inner periphery of the wheel rim, the wheel rim configured to receive a tire at the engaging portion;
    a plurality of air foils configured in a series around the inner periphery of the wheel rim;
    wherein the plurality of air foils each comprise a convex aerodynamic shape having a leading edge and a trailing edge, the leading edge of each of the plurality of air foils comprising a greater thickness than the trailing edge, and the plurality of air foils is positioned in a series with the trailing edge abutting the leading edge of another one of the air foils and a first end of the plurality of spokes is positioned between the trailing edge of one of the air foils and the leading edge of another one of the air foils;
    wherein the plurality of air foils is placed for optimum wind flow and is angled to force wind past the air foils creating increased forward momentum while a bicycle is in forward motion; and
    wherein the air foils reduce drag and increase forward momentum by cutting turbulence created when the wheel spins.

4. The cycling aero foil system of claim 3, wherein a second end of each of the plurality of spokes is attached to a hub associated with the wheel rim.

5. The cycling aero foil system of claim 3, wherein the plurality of spokes comprises 20 individual spokes with each of the plurality of air foils being approximately eighty millimeters in length.

6. The cycling aero foil system of claim 3, wherein the plurality of spokes comprises 24 individual spokes with each of the plurality of air foils being approximately sixty millimeters in length.

7. A cycling aero foil system comprising
    a wheel rim having
        a tire engaging portion; and
        an inner periphery;
    a plurality of spokes positioned around said inner periphery of the wheel rim, the wheel rim configured to receive a tire at said engaging portion;
    a plurality of air foils configured in a series around the inner periphery of the wheel rim;
    wherein the plurality of air foils each comprise a convex aerodynamic shape having a leading edge and a trailing edge;
    wherein the plurality of air foils is placed for optimum aerodynamic flow and is angled to force wind past the air foils creating increased forward momentum while a bicycle is in forward motion;
    wherein sad the air foils reduce drag and increase forward momentum by cutting turbulence created when the tire spins;
    wherein the leading edge of each of said plurality of air foils comprise a greater thickness than the trailing edge;
    wherein the plurality of air foils is positioned in a series with the trailing edge abutting the leading edge of another one of the air foils;
    wherein a first end of the plurality of spokes is positioned between the trailing edge of one of the air foils and the leading edge of another one of the air foils;
    wherein a second end of each of the plurality of spokes is attached to a hub of the wheel rim;
    wherein the plurality of air foils is integral to the wheel rim;
    wherein each of the plurality of air foils comprises a convex bulbous profile;
    wherein each of said plurality of air foils comprises a rounded leading edge;
    wherein each of the plurality of air foils comprises a sharp trailing edge;
    wherein an upper surface and a lower surface of each of the plurality of air foils comprises a symmetrical curvature;
    wherein the plurality of air foils are comprised of carbon fiber;
    wherein the plurality of air foils are configured continuously along an entire said inner periphery of the wheel rim;
    wherein the leading edge is positioned in front of each of said spokes and the trailing edge is positioned behind each of the spokes; and
    wherein the wheel rim comprises a plurality of apertures configured to receive the first end of the plurality of spokes.

* * * * *